United States Patent [19]

Derhaag et al.

[11] Patent Number: 4,875,233
[45] Date of Patent: Oct. 17, 1989

[54] HEADSET CONSTRUCTION AND METHOD OF MAKING SAME

[76] Inventors: Robert L. Derhaag, 1364 Calle Crucero, San Marcos, Calif. 92069; David B. Rose, 1827 Drescher St., San Diego, Calif. 92111

[21] Appl. No.: 109,460

[22] Filed: Oct. 16, 1987

[51] Int. Cl.$^4$ ............................................. H04M 1/05
[52] U.S. Cl. ................................. 379/430; 381/169; 381/183
[58] Field of Search ................. 379/430, 438; 381/183, 381/187, 169; 181/128, 129

[56] References Cited

U.S. PATENT DOCUMENTS

| 1,329,658 | 2/1920 | Gernsback | 381/183 |
| 3,053,944 | 9/1962 | Weeks | 381/187 |
| 3,272,926 | 9/1966 | Falkenberg | 381/187 |
| 3,311,713 | 3/1967 | Knuebel | 381/183 |
| 3,796,841 | 3/1974 | Gorman | 379/430 |
| 4,420,657 | 12/1983 | Larkin | 379/430 |
| 4,634,816 | 1/1987 | O'Malley et al. | 379/430 |

FOREIGN PATENT DOCUMENTS

| 1174663 | 3/1959 | France | 381/187 |
| 250374 | 4/1926 | United Kingdom | 381/187 |
| 421192 | 12/1934 | United Kingdom | 381/187 |
| 892682 | 3/1962 | United Kingdom | 381/187 |

Primary Examiner—Jin F. Ng
Assistant Examiner—Danita R. Byrd

[57] ABSTRACT

A communication headset has an earpiece assembly mounted on one end of an arcuate headband having a single-piece integral, unitary construction and a resilient composition. The earpiece assembly includes an earmuff which engages a user's ear and which receives a speaker and speaker holder. The speaker holder is mounted rotatably to an interface module which in turn is mounted to a microphone module. An end cap engages the interface module and the microphone module. The mounting structure for attaching the microphone module to the interface module enables free 360° rotational movement of the microphone module relative to the interface module about a central axis transverse to the interface module. A temple piece is disposed on the opposite end of the headband for engaging the user's temple. The inventive method for making the headband of the headset includes the steps of forming a rigid outer band member by flowing molten thermoplastic material into a mold, and curing the molten material to form a rigid, springy outer band member; transferring the outer band member to another mold; and flowing molten thermoplastic material into said another mold into engagement with the members, and then curing the molten material to form a cushiony inner member fused to the outer member.

26 Claims, 3 Drawing Sheets

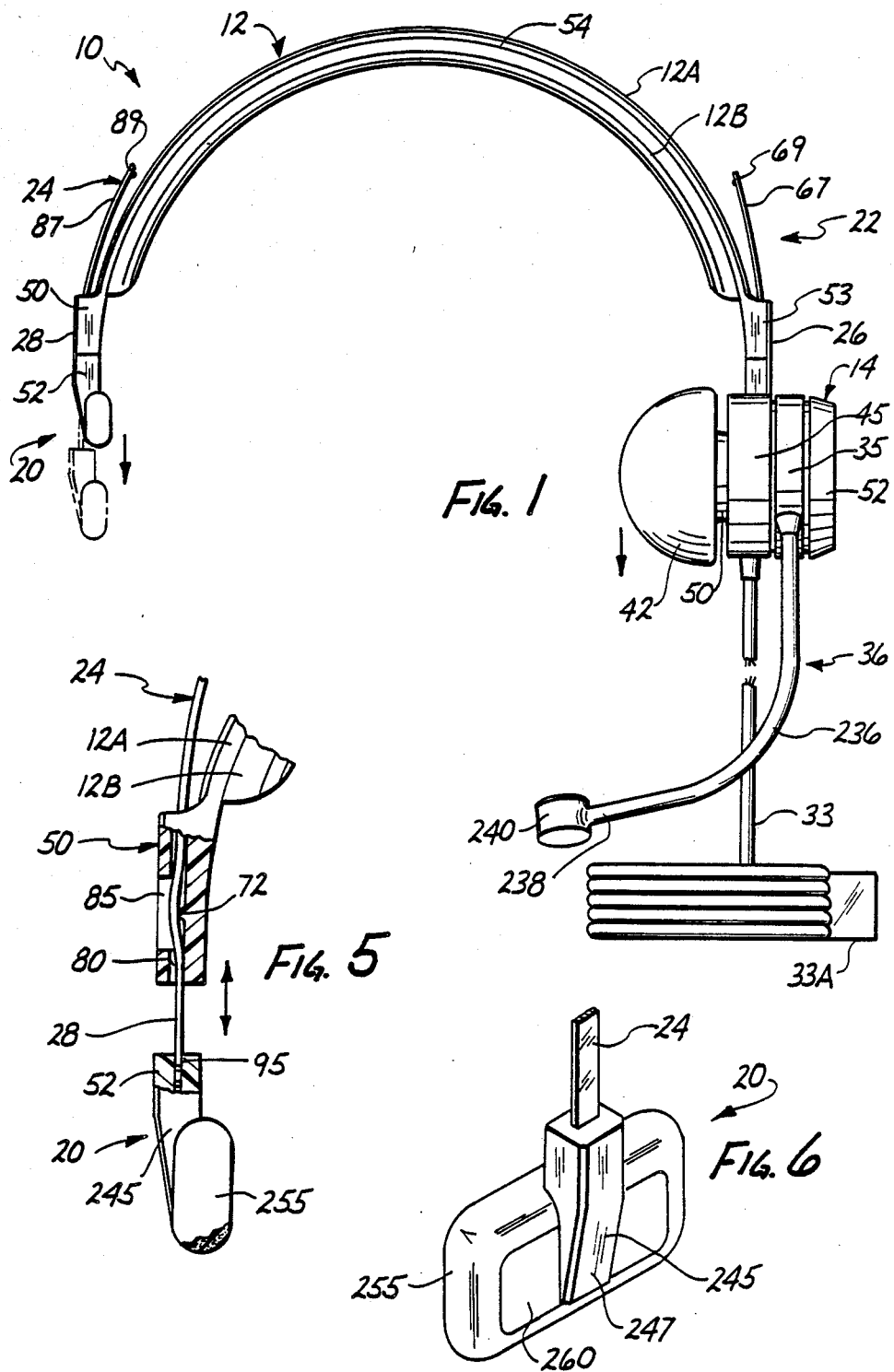

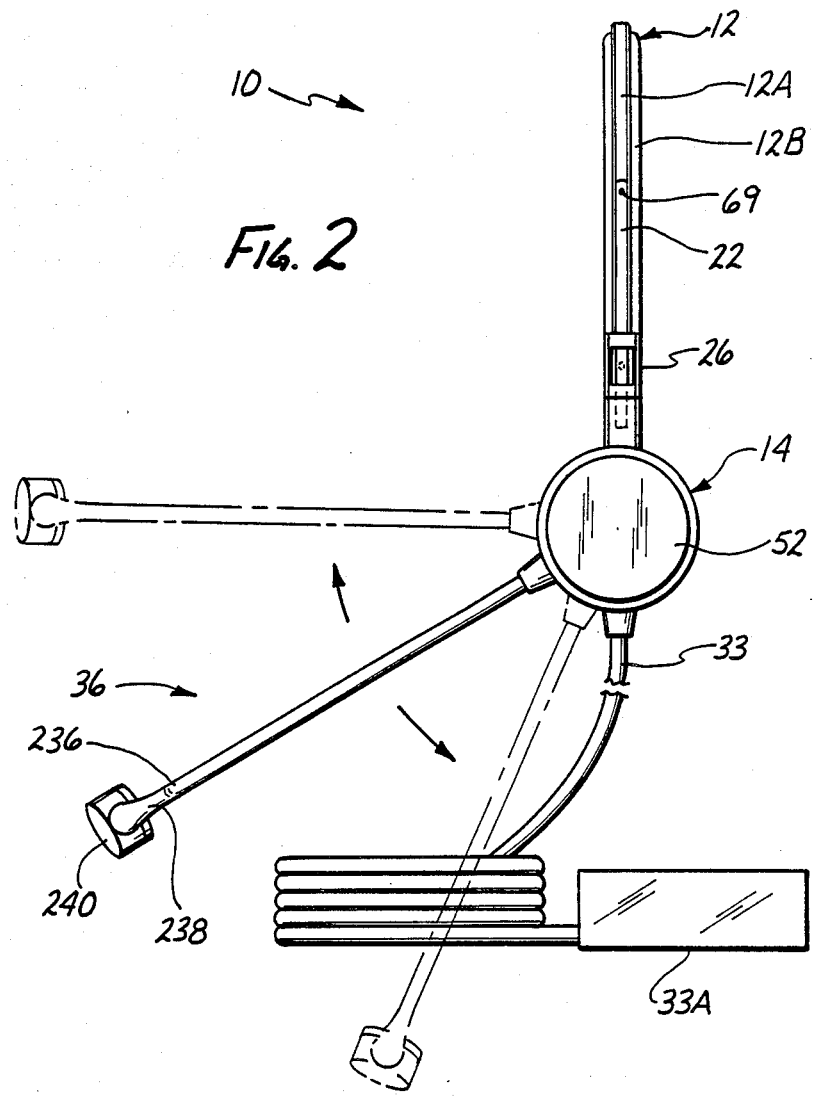
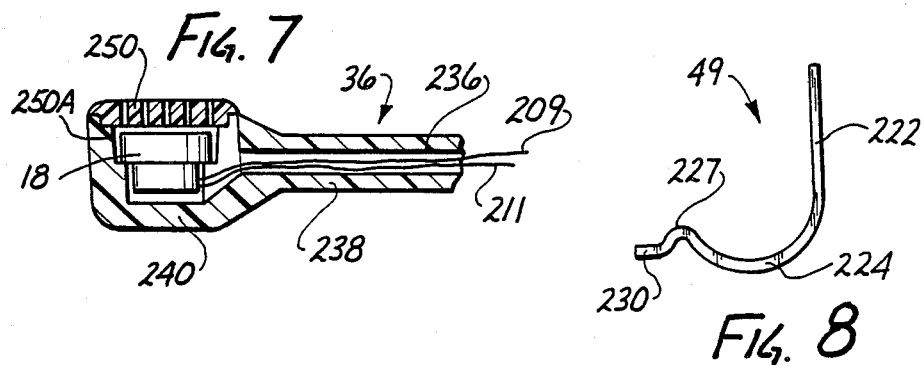

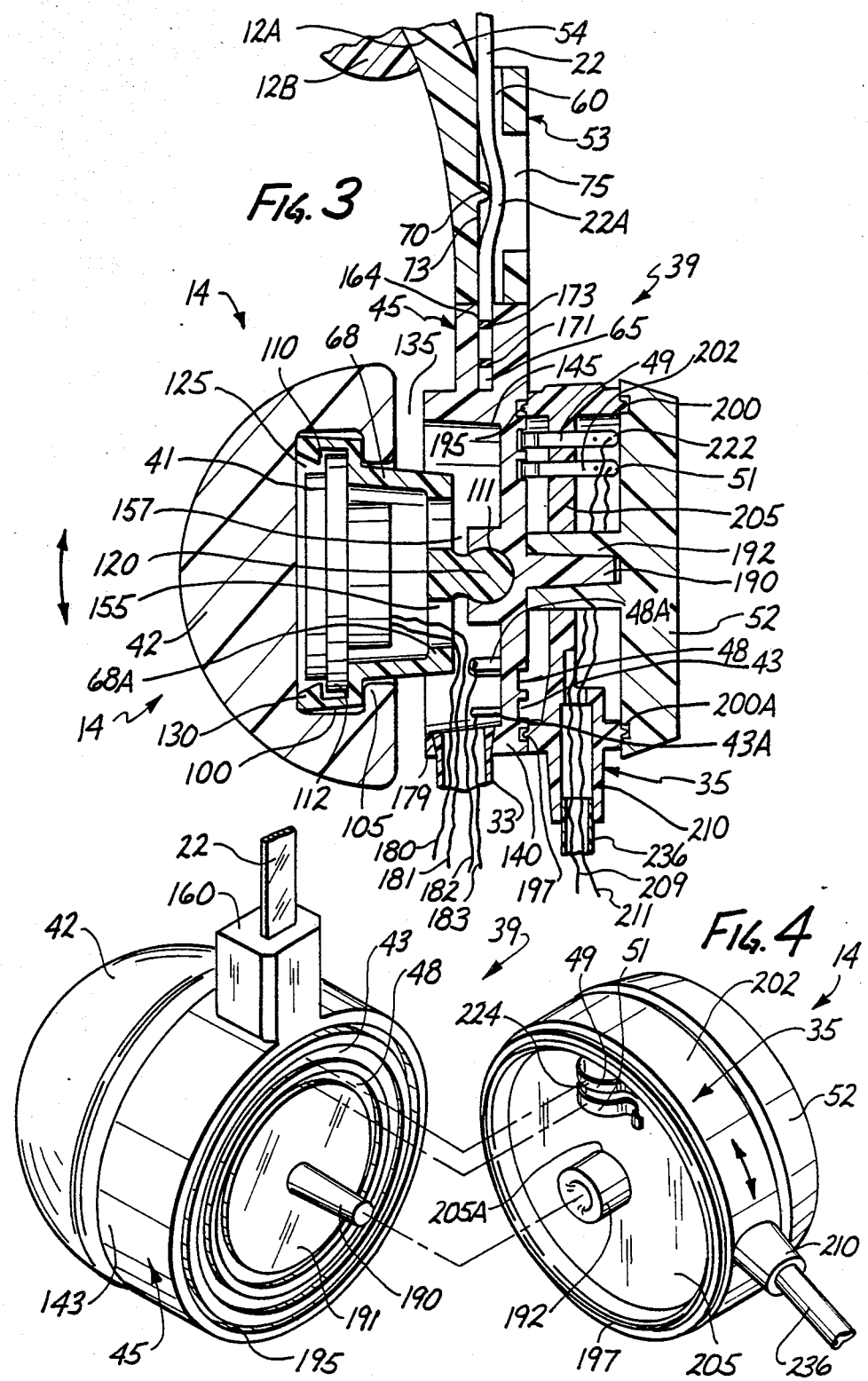

HEADSET CONSTRUCTION AND METHOD OF MAKING SAME

DESCRIPTION

1. Technical Field

The present invention relates in general to a communication device and a method of making it. More particularly, the invention relates to a new and improved headset construction adapted for rugged use, such as for use in fast food restaurants or the like, for extended periods of time, as well as to a method of making such a headset construction.

2. BACKGROUND ART

A headset is a communication device which can be worn on the head to permit the user to exchange verbal communication with another person over a communication link, such as a full duplex radio communication link. A headset generally includes one or two earphones, that are pressed against the user's ears, and a microphone that is positioned in front of the user's mouth. The microphone usually fits on the tip of a short curved arm known as a boom.

The conventional headset frequently includes an adjustable headband, and a metallic spring which positions and maintains forceably the headset against the temples, ears and crown of the user. However, the continuous pressure of the metallic spring for extended periods of time can cause severe discomfort to the user.

While several attempts have been made to relieve the pressure caused by the metal spring, none of these attempts have been completely satisfactory. One attempted solution includes loosening the metallic spring. Such attempt has proven to be particularly unsuccessful, in that the loose headset becomes easily shiftable, and detachable from the user's head.

Therefore, it would be highly desirable to have a new and improved headset construction, and method of making it, whereby the headset construction is light in weight, as well as comfortable to wear for prolonged periods of time, without shifting from its desired position on the user's head.

Another problem associated with known headset constructions, relates to the damage caused to the electrical wiring housed within the boom, connecting the microphone and the earphone to the transceiver and the source of power. In order to protect such wiring from damage caused by the unlimited rotation of the boom about its axis, the conventional boom is provided with stops or detents, to limit its rotation to a certain predetermined angular movement to prevent twisting the wiring unnecessarily. However, the stops can be damaged all too readily and easily, by inadvertently or even deliberately forcing the boom beyond its present limits by forcing the boom past its stops. Thus, when the stops are damaged, the boom becomes rotatable unrestrictedly about its axis, and causes the wiring to twist, to become entangled, and finally to break. Consequently, the entire headset is usually discarded, due to the relatively high cost of repair.

Therefore, it would be highly desirable to have a new and improved headset construction and method of making it, whereby such a headset is not only comfortable to wear, but also its wiring is protected against damage resulting from continuous and unrestricted rotation of the boom. Such a headset should also be relatively simple and inexpensive to repair and to maintain.

When the conventional headsets are used heavily, or handled improperly, for instance when the headsets are used by relatively young personnel in fast food restaurants, or in other similar commercial institutions, the headsets can be subjected to premature breakage. The increased risk of damage is due mainly to the personnel's vigorous and brisk activities, tending to shift the headset from its desired position on the user's head, and to cause it to drop on the floor, or onto other undesirable places, such as hot cooking areas.

The numerous attempted solutions to reduce the risk of premature breakage of the conventional headsets have proven to be less than completely satisfactory. One such attempted solution is to make some parts of the headset of polybutylene terephthalate material, having embedded therein glass and/or mineral fibers. The fibrous fill is used to enable the headset to flex without breaking readily.

However, the polybutylene terephthalate material is semi-rigid, and causes the headset to break when subjected to sudden impacts. Additionally, the use of the fibrous fill material generally increases the maintenance requirement of the molding machinery and tools, due to its highly abrasive nature. Thus, the use of polybutylene terephthalate material has strengthened the headset structure to some extent, at the expense of an increase in the maintenance cost of the headset molding tools. Furthermore, such attempted solution has failed to render the headset more comfortable to wear over prolonged periods of time, and to protect the electrical wiring.

Therefore, it would be highly desirable to have such a new and improved headset, and method of making it, whereby the headset possesses all of the foregoing attributes, and also is durable even under heavy usage conditions. It should be relatively simple and inexpensive to produce, to repair and to maintain. The method of making such a headset construction should be relatively simple and inexpensive.

DISCLOSURE OF INVENTION

Therefore, it is the principal object of the present invention to provide a new and improved headset and a method of making it, which headset is durable and comfortable to wear over extended periods of time, and which has a moveable boom with little or no risk of wire breakage or tangling.

Another object of the present invention is to provide such a new and improved headset and method of making it, whereby such headset is relatively simple and inexpensive to produce and to repair.

Briefly, the above and further objects and features of the present invention, are realized by providing a headset for fitting and engaging the user's crown and temple, and for holding a speaker against the user's ear in a comfortable manner. The headset houses a microphone which is retained adjustably in front of the user's mouth by an adjustably moveable boom. A slip ring arrangement enables the boom to rotate freely about its axis without tangling the wiring for the microphone. The headset further includes a substantially semi-circularly shaped headband for fitting onto and overlying the user's crown, and an earpiece assembly for engaging the user's ear. A temple piece is secured to one end of the headband for engaging the user's temple. The headband has an integral, unitary construction and a compliant, thermoplastic rubber material.

Most of the mechanical components of the headset including the headband, are composed of a compliant, thermoplastic rubber material, sold under the tradename SANTOPRENE, a registered trademark of Monsanto Company, located in Missouri. Thus, the unique and novel use of the Santopren material renders the headset durable, easily moldable, and relatively inexpensive to manufacture. Additionally, due to the low specific gravity of the SANTOPRENE material, the headset is light in weight and comfortable to wear.

The use of the SANTOPRENE, a thermoplastic rubber material eliminates the need for the conventional abrasive fill material. Thus, the maintenance cost of the tooling and injection machinery, as well as the overall manufacturing cost of the headset are reduced substantially.

The present headset is comfortable to wear for prolonged periods of time, without shifting from its desired position on the user's head due to the Santoprene material. The wiring of the present headset is protected against damage resulting from continuous and unrestricted rotation of the boom by the provision of the slip ring arrangement. The headset is relatively simple, durable and inexpensive to repair and maintain.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanyiny drawings, wherein:

FIG. 1 is a front elevational view of a headset which is constructed according to the present invention and which is adapted for use in fast food restaurants;

FIG. 2 is a left side elevational view of the headset of FIG. 1;

FIG. 3 is an enlarged fragmentary sectional elevational view of an earpiece assembly, which forms a part of the headset of FIG. 1, and which illustrates the composition of the various constituent parts thereof;

FIG. 4 is an enlarged, fragmentary, partially-exploded pictorial view of the earpiece assembly of FIG. 3;

FIG. 5 is an enlarged fragmentary front elevational view of a temple piece which forms a part of the headset of FIG. 1, with a portion thereof broken away to illustrate the composition of the various constituent parts and to show the construction thereof;

FIG. 6 is an enlarged fragmentary pictorial view of the temple piece of FIG. 5;

FIG. 7 is an enlarged fragmentary sectional side elevational view of a boom, which forms a part of the headset of FIG. 1;

FIG. 8 is an enlarged elevational view of a wiper, which forms a part of the earpiece assembly of FIG. 3;

FIG. 9 is a block diagram illustrating the process of making a headband, which forms a part of the headset of FIG. 1; and FIG. 10 is a block diagram illustrating the process of making the temple piece of FIG. 5.

BEST MODE FOR CARRYING OUT THE INVENTION

Referring now to the drawings and more particularly to FIGS. 1 and 2 thereof, there is illustrated a headset 10, which is constructed in accordance with the present invention. The headset 10 generally comprises an arcuate substantially semi-circularly shaped headband or bow 12, for fitting over, and for overlying the crown of a user's head (not shown).

As illustrated in FIGS. 1, 3 and 4, an earpiece assembly 14 is mounted on one end 26 of the headband 12, for engaging the user's ear (not shown), and for housing a speaker 41 (FIG. 3). A boom 36 (FIG. 1) is connected rotatably to the earpiece assembly 14, and supports a microphone 18 (FIG. 7), at a desired predetermined distance from the user's mouth (not shown). The headband 12 terminates at its other substantially diametrically opposed end 28 in a temple piece 20, for engaging the user's temple (not shown). Therefore, when the headband 12 is positioned over the user's crown, the earpiece assembly 14 engages the user's ear, while the temple piece 20 engages the opposed temple.

A conventional metallic or steel guide 22 interconnects adjustably the end 26 of the headband 12 and the earpiece assembly 14. A substantially similar guide 24 interconnects adjustably the opposite end 28 of the headband 12 and the temple piece 20. The guides 22 and 24 enable the headset 10 to fit a variety of head sizes, by adjusting the overall size of the headband 12 to fit comfortably over the user's crown. A transceiver unit (not shown) is connected electrically to the microphone 18 and to the earpiece assembly 14 through a substantially coiled cord or cable 33 via a connector 33A. The transceiver unit is generally carried in a remote location relative to the headband 12, such as on the user's belt.

The headband 12 generally includes an arcuate substantially semi-circular outer member or band 12A and an arcuate semi-circularly shaped inner member or band 12B. The outer member 12A has a similar curvature as the inner member 12B, and is secured in overlying relationship therewith. The members 12A and 12B are made of a compliant, resilient thermoplastic rubber material, such as the material sold under the name SANTOPRENE.

The thermoplastic rubber material known by the tradename SANTOPRENE, has been particularly selected for use in the construction of the headband 12, and other parts of the headset 10, due to its availability in various durometric ratings. The wide range of durometric ratings of the SANTOPRENE material renders it suitable for producing rigid resilient members such as the outer member 12A, as well as soft, resilient cushiony members such as the inner member 12B. Furthermore, the unique and novel use of the SANTOPRENE material renders the headset 10 durable, easily moldable, and relatively inexpensive to produce. Additionally, due to the low specific gravity of the Santoprene material, the headset 10 is light in weight and comfortable to wear. The cushiony member 12B also adds to the wearing comfort for the user.

The headset 10 may be made conveniently by various conventional techniques. For instance, the headset 10 can be injection molded, pressure or vacuum formed, thermoset, extruded, or foam molded. Furthermore, the manufacturing process of the headset 10 can be achieved with a high degree of precision and accuracy due to the low shrinkage rate of the SANTOPRENE material.

The use of a common raw material, such as the SANTOPRENE material for the production of most of the mechanical components of the headset 10, renders the manufacturing process more manageable and less expensive, in that it reduces substantially the logistics and labor costs of the manufacturing process. Furthermore, the use of the SANTOPRENE material eliminates the need for the conventional abrasive fill material. Thus, the maintenance cost of the tooling and injection machinery, as well as the overall manufacturing cost of the headset 10, are reduced substantially.

As illustrated in FIGS. 2, 3 and 4, the boom 36 is mounted to be rotatable continuously and freely through 360° about the axis of the earpiece assembly 14. Therefore, there are no detents or other devices to limit the angular rotation of the boom, and thus are not subject to malfunctioning or breakage. In order to prevent the cord 33 from becoming tangled unreasonably, the unrestricted angular rotation of the boom 36 is realized by a slip ring connector 39, which generally includes a pair of concentric smooth conductive ring contacts or tracks 43 and 48. A pair of wipers 49 and 51 travel along the entire circumferential length of the corresponding tracks 43 and 48, and maintain continuous electrical contact between the microphone 18, the earphone 41, the transceiver and the source of power, even when the microphone boom 36 is rotated about its axis. Thus, the use of the slip ring connector 39 eliminates the need for the conventional stops or detents, and enables the boom 36 to be rotated in an unrestrained manner, without the risk of damaging the headset 10 or the wiring therefor.

In use, the headset 10 is placed on the user's head, by flexing the headband 12 outwardly, and by placing the inner member 12B on the crown. The overall length of the headband 12 is then adjusted by the steel guides 22 and 24. Next, the earpiece assembly 14 is engaged with the user's ear, and the headband 12 is released, to cause the temple piece 20 to press against the user's temple. The microphone boom 36 is then rotated about its axis for positioning adjustably the microphone 18 in front of the user's mouth.

Considering now the headband 12 in greater detail, with particular reference to FIGS. 1 and 2 of the drawings, it generally includes the soft, flexible, cushiony, elongated arcuate inner member 12B for overlying the crown of the user's head, to maintain a prolonged comfortable contact therewith. Thus, the inner member 12B replaces the conventional headband padding material.

The outer elongated arcuate member 12A overlies the inner member 12B, for rigidifying it, to cause the headband 12 to flex resiliently. The outer member 12A is connected integrally to the inner member 12B, and it replaces the conventional steel spring. As illustrated n FIG. 2, the inner member 12B is wider than the outer member 12A, for providing a relatively large surface of contact with the crown, to cause the pressure exerted by the outer member 12A to spread over a wider area of the crown, and thus to render the headset 10 more comfortable to wear over prolonged periods of time.

While both the outer and inner members 12A and 12B are made of SANTOPRENE, a thermoplastic rubber material, each member has a particular composition, and a different degree of rigidity, resiliency and softness, for serving a distinct purpose. For instance, the outer member 12A has a more rigid structure for flexing resiliently in order to withstand severe impacts without breaking. Furthermore, while the outer member 12A is designed to apply sufficient pressure to the crown, for maintaining the headset 10 securely in position without shifting, the inner member 12B has a softer composition to provide comfort during the extended periods of use.

As illustrated in FIG. 1, the outer member 12A terminates at both ends in two enlarged sections 50 and 53, for retaining the substantially flat, elongated and bowed steel guides 24 and 22, respectively. The enlarged sections 50 and 53 are interconnected by a bowed section 54, and are generally similar in design and construction. Therefore, only the enlarged section 53 will be described hereinafter in greater detail with reference to FIG. 3 of the drawings.

As shown in FIG. 3, the enlarged section 53 depends integrally from the bowed section 54, and is substantially rectangular in cross-section. In order to adjust the overall length of the headset 10, the enlarged section 53 has a central elongated narrow opening 60 which extends throughout the entire length thereof, for receiving the steel guide 22, which extends therethrough. In this regard, the steel guide 22 has one of its ends 65 anchored fixedly to the earpiece 14, and has its other opposite free end 67 (FIG. 1) extending arcuately from the enlarged section 53.

A bead or projection 70 protrudes outwardly integrally from a wall 73 of the enlarged section 53 facing away from the head for deforming the steel guide 22. In this regard, a cross or side opening 75 communicates with the opening 60, and is disposed opposite the bead 70 for receiving a deformed or bowed portion 22A of the steel guide 22. Thus, the deformation of the guide 22 prevents it from slipping, and causes it to be retained securely and frictionally in position during use. Furthermore, as illustrated in FIGS. 1, and 2, a free end 67 of the steel guide 22 has a crimp 69 which acts as a stop, and which prevents the free end 67 from entering the opening 60, in order to keep the guide 22 and the earpiece 14 from becoming detached from the headband 12.

As illustrated in FIG. 5, the enlarged portion 50 is generally oppositely diametrically disposed relative to the enlarged portion 53. The enlarged portion 50 generally includes a narrow opening 80 which is substantially similar to the opening 60, for receiving the guide 24. An internal bead or projection 72 protrudes outwardly integrally into an opening 80 for deforming the steel guide 24 thereabout, in order to retain it releasably in position, and to prevent it from slipping undesirably through the opening 80. A large side opening 85 is similar to the opening 75, and receives the deformed portion of the steel guide 24.

The steel guide 24 has one of its ends 95 anchored fixedly to the temple piece 20, and has its opposite free end 87 extending arcuately beyond the enlarged section 50. The free end 87 has a crimp 89 which acts as a stop, and which prevents the free end 87 and the temple piece 20 and the guide 24 from becoming disassembled from the headband 12.

Therefore, the headset 10 can fit various head sizes by simply adjusting the distances of the earpiece 14 and the temple piece 20 from the respective enlarged sections 53 and 50 of the headband 12. Furthermore, the retention of the steel guides 22 and 24 inside the enlarged sections 53 and 50, relieves the ear and temple of the user from the pressure required to maintain the earpiece 14 and the temple piece 20 connected to the headband 12.

Considering now the earpiece assembly 14 in greater detail with respect to FIGS. 1, 3, 4 and 8, it is mounted adjustably at the end 26 of the headband 12, and it is secured to the guide 22. The earpiece assembly 14 generally includes an earmuff 42 which engages the user's ear, and which receives a speaker 41, and a speaker holder 68. The speaker holder 68 is mounted rotatably to a speaker interface module 45, which in turn, is connected electrically to, and mounted to, a microphone interface module 35. An end cap 52 engages the speaker interface module 45 and the microphone interface module 35, for providing the headset 10 with an aesthetically pleasing appearance.

The earmuff 42 is composed of SANTOPRENE, a thermoplastic rubber material and has a soft and smooth composition, for providing comfort to the user, when it engages the ear. The earmuff 42 has a substantially semi-spherical outer shape for engaging the cavity of the ear, in order to prevent accidental shifting of the headset 10. The earmuff 42 provides a cushioning support member to the earpiece assembly 14, and it is substantially acoustically transparent, to allow the passage and propagation of the sound therethrough, to the user's ear.

The earmuff 42 defines an inner elongated opening 100 which is shaped and dimensioned to receive the speaker holder 68 snugly. An inner annular shoulder 105 is also defined by the earmuff 42, and extends inside the inner opening 100 for retaining the speaker holder 68 securely inside the opening 100.

The speaker holder 68 includes a flared annular forward portion 110, which is circular in cross-section, which fits inside the opening 100, and which is retained therein by an annular shoulder 105 surrounding a mouth 100A of the opening 100. An internal annular groove 110 receives an annular flange 112 of the speaker. A centrally disposed ball 120 extends rearwardly integrally from a rear wall 68A, for engaging rotatably a socket 111 of the speaker interface module 45 to provide a universal, spherical, freely-moveable joint between the holder 68 and the module 45.

An inner opening or cavity 125 of the holder 68 is sized and dimensioned to receive the speaker 41. A forwardmost annular inner shoulder or flange 130 retains the speaker 41 in position inside the speaker holder 68 and the earmuff 42.

Therefore, while the steel spring 22 provides latitude for coarse adjustments of the earpiece assembly 14 relative to the ear, the speaker holder 68 provides fine axial adjustments of the earmuff 42 relative to the ear. In this respect, the shoulder 105 is disposed at a relatively short distance from the speaker interface module 45 for defining a clearance space 135, in order to permit fine adjustments of the earmuff 42 relative to the speaker interface module 45.

As illustrated in FIGS. 3 and 4, the speaker interface module 45 is generally cup-shaped, and includes a base member or back wall 140 which is integrally formed with an annular wall 143 defining an inner cavity 145 receiving a portion of the speaker holder 68. The socket 111 is centrally disposed concentrically relative to the annular wall 143, and is positioned within the inner cavity 145.

The ball joint connection enables the user to make fine adjustments to the earpiece assembly 14.

When the ball joint 120 is assembled, the latter is disposed axially rearwardly of the bottom wall 68A of the speaker holder 68, with a clearance space 157 therebetween, to enable the positioning of the speaker holder 68 relative to the speaker interface module 45.

As shown in FIGS. 3 and 4, an inwardly projecting generally elongated member 160 of the module 45, is hollow throughout its entire length for defining a narrow opening 164 to receive the lower end 65 of the steel guide 22 in a snug and tight manner. The opening 164 is generally axially aligned with the opening 60 of the enlarged section 53 for enabling the steel guide 22 to extend continuously through both openings.

In order to cause the guide 22 to be retained by, and anchored to, the raised member 160, the opening 164 is narrower than the opening 60. In this regard, the lower end 65 of the guide 22 includes a plurality of holes, such as the holes 171 and 173 which extend through the the guide 22. During the injection molding process of the speaker interface module 45, the molten SANTOPRENE, a thermoplastic rubber material, infiltrates the holes 171 and 173 to enhance the retention of the guide 22 within the raised member 160.

As illustrated in FIG. 2, the raised member 160 is generally complementary shaped relative to the enlarged section 53, and has a width which is substantially equal to that of the inner member 12B, for giving the headset 10 a generally slim-looking, aesthetically pleasing appearance. The wall 143 defines an aperture 179 which extends radially throughout its entire thickness, and which is generally diametrically opposed relative to the raised member 160. The aperture 179 enables electrical conductors, such as the conductors 180, 181, 182 and 183 to extend therethrough into the cable 33, which is connected to the remotely located transceiver. An opening 150 in the rear wall of the holder receives the conductors 180 and 181, which terminate at the speaker.

For illustration purposes only, the cable 33 is shown to include four conductors 180 through 183. The conductors 182 and 183 are connected to the microphone 18 via the microphone interface module 35, as will be described later in greater detail. It will become apparent to those skilled in the art, that, if desired, other conductors can also be extended through the microphone interface module 35, for various purposes.

For the purpose of mounting rotatably the boom supporting module 35 to the interface module 45, a central rodlike pivot post or pin 190 projects rearwardly from a rear wall 191 for engaging frictionally and rotatably a complementary tubular socket 192 of the end cap 52 projecting toward the rear wall 191. As illustrated in FIGS. 3 and 4 the rear wall 191 includes an internal annular groove 195 for receiving a corresponding complementary shaped annular bead 197, which protrudes integrally toward the groove 195 from the microphone interface module 35 for riding freely within the groove 195.

The microphone interface module 35 is connected to the end cap 52 by an annular bead 200 which extends integrally outwardly from the microphone interface module 35 into a groove 200A in the end cap 52 to ride freely therein. Therefore, the microphone interface module 35 can be rotated freely relative to the module 45 and the end cap 52. The entire earpiece assembly 14 is a single unitary modular type structure, which can be assembled or disassembled readily and conveniently for construction and maintenance, or for other purposes.

Considering now the microphone interface module 35 in greater detail with particular reference to FIGS. 3 and 4, it generally includes a generally circular disc-like body 202, having a circular wall 205. The wall 205 is centrally and complementary apertured at 205A for receiving and engaging frictionally the tubular member 192 of the end cap 52 to enable the module 35 to rotate freely about the socket 192. In this respect, and as shown in FIG. 3, the post 190 and the socket 192 are substantially equal in length and to the width of body 202, for providing a compact interengagement therewith. A hollow tubular member 210 depends from the body 202 for receiving and engaging fixedly the boom 36, and for providing a passageway or conduit for electrical conductors or wires 209 and 211, between the microphone 18 at the end of the boom and the remote transceiver.

The slip ring connector generally indicated at 39 is disposed partly on the outer surface 191 of the speaker interface module 45, and partly within the microphone interface module 35, for providing a continuous uninterrupted electrical communication between the microphone 18 and the remote transceiver, during the rotation of the boom 36 about its axis. In this regard, and as illustrated in FIGS. 3 and 4, the slip ring connector 39 includes a plurality of generally smooth circular and concentric annular tracks or ring contacts. For illustration purposes only, the slip ring connector 39 is shown equipped with only two annular tracks 43 and 48 on the back side of the wall 140. However, it will become apparent to those skilled in the art, that there may be more than that number of tracks used for providing additional electrical contact. The conductors 43 and 48 are connected respectively to the terminals 43A and 48A that extend substantially orthogonally to the plane of the conductors 43 and 48. The terminals 43A and 48A are in turn connected to the conductors 182 and 183 by conventional techniques, such as by soldering, for providing part of the communication path between the microphone 18 and the transceiver.

A corresponding number of wipers 49 and 51, form a part of the slip ring connector 39, and are secured fixedly to the microphone interface module 35 and engage slidably and electrically the respective tracks 43 and 48. The wipers follow their respective tracks when the microphone interface module 35 is rotated about its axis, in order to maintain a continuous and uninterrupted electrical contact therewith. Thus, the boom 36 is rotatable 360 degrees freely about its axis, without the requirement for conventional stops or limits, and without causing the electrical wiring to become entangled and to break, Thus, proper positioning relative to the user's mouth can be achieved readily, and the chance of inadvertent breakage or damage is minimized or greatly reduced.

Considering now the wipers 49 and 51 in greater detail with reference to FIGS. 3, 4 and 8, they are generally similar to one another, and therefore only the wiper 49 will be described in greater detail. The wiper 49 includes a flat elongated member 222 is generally J-shaped and composed of a conductive resilient metal material. The member 222 extends through an opening in the rear wall 205 and is embedded in place. The member 222 has one of its ends connected to the conductor 209 by conventional techniques such as by soldering, for connecting it electrically to the microphone 18.

The member 222 is a unitary one-piece construction, and extends at its opposite end into a bowed or arcuate portion 224, which is substantially semi-circular and which engages the track 43, frictionally and tangentially, for providing an electrical contact therewith. The bowed portion 224 has a smooth surface to prevent the track 43 from becoming scratched or unnecessarily worn. The bowed portion 224 extends integrally to a rigidifying crimped portion 227, and from there terminates at a distal end 230.

Considering now the composition of the various parts of the earpiece assembly 14 with reference to FIG. 3, the earmuff 42, the speaker holder 68, the speaker interface module 45, the microphone interface module 35 and the end cap 52, are made of SANTOPRENE, a thermoplastic rubber material having different durometric ratings. In this respect, the earmuff 42 is soft and spongy for cushioning purposes, and the remaining parts are solid and rigid. The wipers 49 and 51 are preferably made of beryllium copper. The tracks 43 and 48 are made of thermoplastic material, such as the SANTOPRENE, a thermoplastic rubber material, having impregnated therein silver or aluminum flakes, in order to render them electrically conductive.

Considering now the cable 33 in greater detail with reference to FIGS. 1 and 2, it includes the electrical conductors 180, 181, 182 and 183 which extend through the speaker interface module 45 via an aperture 179. The cable 33 is coated externally with a relatively thin layer of SANTOPRENE, a thermoplastic rubber material, to rigidify its structure and to of protect the conductors 180–183.

Considering now the boom 36 in greater detail with reference to FIGS. 1, 2 and 7, it generally includes an elongated bowed tubular member 236, which is hollow throughout its entire length, for enclosing and protecting the conductors 209 and 211, which extend from the microphone interface module 35, through the tubular member 210 to the microphone 18 at the distal end of the boom. The boom 36 is a unitary construction, and has one of its ends secured to the microphone interface module 35. The boom 36 has its opposite distal end 238 terminate in an enlarged hollow portion 240 for confining the microphone 18. A perforated cover 250 (FIG. 7) fits over an opening 250A to the hollow interior of the enlarged portion 240 for retaining the microphone 18 therewithin, and for enabling audio signals to propagate therethrough, to the microphone 18. The boom 36 is preferably made of rigid SANTOPRENE, a thermoplastic rubber material.

Considering now the temple piece 20 in greater details with respect to FIGS. 1, 5 and 6, it generally includes an elongated support member 245 which is fixed at one end of the steel guide 24, in a similar manner as the guide 22 and the speaker interface module 45. The support member 245 has a tapered end 247 which retains a generally rectangular pad 255, which extends transversely to the member 245. The pad 255 is made preferably composed of a soft SANTOPRENE, a thermoplastic rubber material, and has a soft, cushiony composition to provide a comfortable engagement of the headband 12 with the user's temple.

A rectangular backing plate 260 is disposed intermediate the pad member 255 and the support member 247, for rigidifying the structure of the soft pad member 255. The support member 245, the pad member 255 and the rigidifying plate 260 can be injection molded in such a manner as to become connected unitarily. The method of making the temple piece 20 is hereinafter described in greater detail. The temple piece 20, as well as the earpiece assembly 14 can be positioned adjustably relative to the user's temple and ear, by simply separating them to a desired distance from the headband 12, to cause the headset 10 to fit comfortably on the user's head.

Referring now to FIG. 9, there is illustrated the process of making the headband 12. The rigid outer member 12A is injection molded by flowing the corresponding molten SANTOPRENE, a thermoplastic rubber material at 302 into a suitable mold (not shown), and then by curing the molten material, as indicated at 305 to form the member 12A. The curved member 12A is then transferred from its mold to another mold (not shown), where it is inserted therein.

The softer inner member 12B is then injection molded by flowing molten SANTOPRENE, a thermoplastic rubber material at 310 into the other mold into engagement with the cured member 12A therein. The material is then cured at 315, to cause the inner member 12B to be fused unitarily to the outer member 12A.

As illustrated in FIG. 10, a similar process 320 is followed with respect to the making of the temple piece 20. In this regard, the rigid support member 245 is first injection molded by flowing the corresponding molten SANTOPRENE, a thermoplastic rubber material at 325, and then by curing it at 330.

The cured member is then transferred to another mold (not shown). The softer pad member 255 is then injection molded by flowing molten SANTOPRENE, a thermoplastic rubber material at 335 into engagement with the previously cured member. The molten material is then cured at 340, to cause the pad member 255 to be fused into a one-piece construction, with the rigid support member 245.

While a particular embodiment of the present invention has been disclosed, it is to be understood that various different modifications are possible and are contemplated within the true spirit and scope of the appended claims. There is no intention, therefore, of limitations to the exact abstract or disclosure herein presented.

What is claimed is:

1. A headset for fitting and engaging a user's crown and temple, for positioning a speaker opposite the user's ear, and for retaining a microphone in front of the user's mouth, comprising:
   an arcuate headband for fitting and overlying the user's crown, said headband being composed of a thermoplastic rubber material;
   an earpiece assembly being secured to one end of said headband for engaging the user's ear;
   a temple piece being secured to the opposed end of said headband for engaging the user's temple;
   means for positioning the microphone selectively in front of the user's mouth;
   said headband having an integral unitary molded structure, and including an inner soft member for engaging the user's crown, and an outer resilient member for rigidifying said inner soft member, and preventing breakage or malfunctioning of said headband; and
   said earpiece assembly including an earmuff for engaging the user's ear, a speaker holder for retaining the speaker adjustably against the user's ear, a speaker interface module connected rotatably to said speaker holder, and which is further connected adjustably to said headband, and a microphone interface module connected rotatively to said speaker interface module, and a slip ring connector for providing continuous electrical contact between said speaker interface module, and said microphone interface module.

2. A headset according to claim 1 further including first means for securing said earpiece assembly adjustably relative to said headband.

3. A headset according to claim 2, further including second means for securing said temple piece adjustably relative to said headband.

4. A headset according to claim 3, wherein said first and second means for securing include a pair of guides having a flexible structure.

5. A headset according to claim 1, wherein said inner member is wider than said outer member for providing a relatively large surface of contact with the user's crown.

6. A headset according to claim 1, wherein a first portion of said slip ring connector is connected to said speaker interface module, and a second portion of said slip ring connector is connected to said microphone interface module.

7. A headset according to claim 6, wherein said first part includes a plurality of concentric electrically conducting tracks.

8. A headset according to claim 7, wherein said first part includes two concentric tracks, which are substantially circularly shaped.

9. A headset according to claim 7, wherein said second part includes a plurality of electrically conductive wipers.

10. A headset according to claim 9, wherein said tracks are each composed of thermoplastic rubber material embedding a plurality of electrically conductive flakes.

11. A headset according to claim 10, wherein said thermoplastic material is sold under the tradename Santoprene.

12. A headset according to claim 10, wherein said wipers are made of beryllium copper.

13. A headset according to claim 1, wherein said microphone means for positioning the microphone selectively in front of the user's mouth includes a boom.

14. A headset according to claim 1, wherein said temple piece is a unitary integral structure.

15. A headset according to claim 14, wherein said temple piece includes a rigid support member secured adjustably to said headband, and a soft pad member for pressing against the user's temple.

16. A headset according to claim 15, wherein said temple piece is made of a thermoplastic rubber material.

17. A headset according to claim 16, wherein said thermoplastic rubber material is sold under the tradename Santoprene.

18. A headset according to claim 1, wherein said earmuff is made of a thermoplastic material.

19. A headset according to claim 18, wherein said speaker holder is made of a thermoplastic material.

20. A headset according to claim 19, wherein said speaker interface module is made of a thermoplastic material.

21. A headset according to claim 20, wherein said microphone interface module is made of a thermoplastic material.

22. A headset according to claim 1, further including mounting means interconnecting said speaker holder and said speaker interface module to provide universal rotation.

23. A headset according to claim 22 wherein said mounting means is a ball and socket.

24. A headset according to claim 1 wherein said arcuate headband comprises:
   a one-piece integral unitary molded structure, and including an inner soft, flexible, cushiony, elongated arcuate member for engaging the user's crown to maintain a prolonged comfortable contact therewith, and an outer resilient member fused to said inner member for rigidifying said inner soft member, and for flexing resiliently to prevent breakage or malfunctioning of said headband.

25. A headset for fitting and engaging a user's crown and temple, for positioning a speaker opposite the user's ear, and for retaining a microphone in front of the user's mouth, comprising:
- an arcuate headband for fitting and overlying the user's crown;
- an earpiece assembly being secured to one end of said headband for engaging the user's ear;
- an said earpiece assembly including interface means connected to said headband;
- speaker means adjustably mounted to one side of said interface means;
- microphone means connected rotatably to the other side of said interface means for positioning the microphone selectively in front of the user's mouth;
- mounting means attaching said microphone means and said interface means for enabling substantially free 360° rotational movement of said microphone means relative to said interface means about a central axis transverse to said interface means;
- electrical connector means for providing a continuous electrical connection between said microphone means and said interface means as said interface means and said microphone means rotate relative to one another;
- a temple piece being secured to the opposed end of said headband for engaging the user's temple;
- wherein said headband is composed of a thermoplastic rubber material;
- wherein said earpiece assembly includes an earmuff for engaging the user's ear;
- wherein said earpiece further includes a speaker holder for retaining the speaker adjustably against the user's ear;
- wherein said interface means includes a speaker interface module connected rotatably to said speaker holder, and which is further connected adjustably to said headband;
- wherein said earpiece assembly further includes a microphone interface module connected rotatively to said speaker interface module; and
- wherein said earpiece assembly further includes an end cap secured to said speaker interface module, and said microphone interface module.

26. A headset according to claim 25 wherein said earmuff, speaker holder, speaker interface module, microphone interface module and end cap are composed of thermoplastic material sold under the tradename Santoprene.

* * * * *

UNITED STATES PATENT AND TRADEMARK OFFICE
CERTIFICATE OF CORRECTION

PATENT NO. : 4,875,233

DATED : October 17, 1989

INVENTOR(S) : Robert L. Derhaag, et al.

It is certified that error appears in the above-identified patent and that said Letters Patent is hereby corrected as shown below:

Column 3, line 31, before "drawings", delete "accompanyiny", and substitute therefor --accompanying--.

Column 5, line 46, after "illustrated", delete "n", and substitute therefor --in--.

Column 10, line 16, after "structure and to", delete "of".

Column 13, line 7, before "said earpiece", delete "on".

Signed and Sealed this

Nineteenth Day of March, 1991

Attest:

HARRY F. MANBECK, JR.

*Attesting Officer*      *Commissioner of Patents and Trademarks*